United States Patent [19]
Chirehdast et al.

[11] Patent Number: 5,658,017
[45] Date of Patent: Aug. 19, 1997

[54] TUBE NUT TORQUE LIMITING METHOD AND APPARATUS

[76] Inventors: Mehran Chirehdast, 6652 Westwood Ct., West Bloomfield, Mich. 48322; Michael Stephens Martin, II, 3614 Hipp, Dearborn, Mich. 48124; William Leo Murray, 7900 N. Fountain Pk., Apt. 3A-124, Westland, Mich. 48185

[21] Appl. No.: 538,326

[22] Filed: Oct. 3, 1995

[51] Int. Cl.⁶ .................................. F16L 35/00
[52] U.S. Cl. .................. 285/4; 285/334.5; 285/3; 411/3
[58] Field of Search ................. 285/1–4, 327, 285/334.5; 411/1–3; 403/2

[56] References Cited

U.S. PATENT DOCUMENTS

| | | | |
|---|---|---|---|
| 1,564,965 | 12/1925 | Kraft | 285/327 |
| 3,149,697 | 9/1964 | Bendeich et al. | 285/3 |
| 3,742,583 | 7/1973 | Devlin | 411/2 |
| 4,073,512 | 2/1978 | Vian et al. | 285/334.5 |
| 4,304,422 | 12/1981 | Schwarz . | |
| 4,519,449 | 5/1985 | Hoskins et al. | 285/4 |
| 4,575,274 | 3/1986 | Hayward | 403/2 |
| 4,789,759 | 12/1988 | Jones | 285/3 |
| 5,052,719 | 10/1991 | Boehm . | |

FOREIGN PATENT DOCUMENTS

| | | | |
|---|---|---|---|
| 2403484 | 5/1979 | France | 411/3 |
| 2817438 | 10/1979 | Germany | 285/334.5 |
| 17810 | 1/1944 | United Kingdom | 285/327 |
| 854792 | 11/1960 | United Kingdom | 411/3 |
| 898026 | 6/1962 | United Kingdom | 411/3 |

*Primary Examiner*—Eric K. Nicholson

[57] ABSTRACT

A tube nut torque limiting method and apparatus provides direct mechanical control of the maximum torque that can be generated when securing a tubular member within an internally threaded component. The torque limiting tube nut includes an externally threaded portion (14), a service head portion (16) and an installation head portion (22). A shoulder (24) is disposed between the service head portion (16) and the installation head portion (22) to mechanically control the maximum torque applied to the externally threaded portion (14). Upon separation of the installation head portion (22) at the shoulder (24), the installation head portion (22) includes a removal passage (40) for allowing the installation head portion (22) to simply be removed from the tubular member (28).

16 Claims, 1 Drawing Sheet

TUBE NUT TORQUE LIMITING METHOD AND APPARATUS

BACKGROUND OF THE INVENTION

1. Field of the Invention

This invention relates generally to tube fasteners and methods for controlling the torque applied thereto. More particularly, the present invention provides a method and apparatus for ensuring a predetermined level of torque is achieved and not exceeded during installation of a tube nut on a brake tube having a flared end.

2. Disclosure Information

The principal function of a tube nut is to provide a compressive force to retain an end of a tube in a sealed relationship with an adjacent component. Commonly, this is done using a flared end on the tube and a similarly chamfered flared end receiver on the inside of the component. It has been recognized, however, that fluid may seep from this assembly if there is not enough or too much compressive force generated by the tube nut. Specifically, too little force and the surfaces may not seal and too much force can cause the flared end to crack, providing a passage for fluid seepage.

One solution for this would be to use complex, electronically controlled torque wrenches for applying a torque that is within the acceptable range for proper sealing. However, if the calibration of the electronically controlled wrench drifts, or the wrench malfunctions in some other way, the tube nut may not properly seal the tubular member. Additionally, there is no way for the operator to visually inspect the tube nut to determine whether it will leak, since fluid may not be present when the tube nut is installed.

It would be desirable to have a tube nut torque limiting method and apparatus for installing a tubular member in an internally threaded component that would ensure proper compressive forces for sealing the tubular member. It would be further desirable if the tubular nut could be visually inspected for proper installation.

SUMMARY OF THE INVENTION

The present invention provides a torque limiting serviceable fastener for fastening a tubular member to an internally threaded component with a predetermined amount of compressive sealing force, which may easily be verified by visual inspection. The torque limiting serviceable fastener includes an externally threaded portion and a service head portion disposed adjacent to said externally threaded portion. An installation head portion is located adjacent to the service head portion on a side opposite the externally threaded portion. A shoulder is disposed between the service head portion and the installation head portion and being adapted to fracture when the installation head portion is subjected to an applied torque exceeding a predetermined torque limit.

The fastener also includes a bore extending axially through the externally threaded portion, the service head portion, the shoulder portion and the installation head portion. The bore has a diameter sufficient to receive the tubular member therethrough. A removal passage is radially disposed in the installation head portion and the shoulder portion and has sufficient clearance to the tubular member to allow separation of the installation head portion from the tubular member upon fracturing the shoulder portion.

The torque limiting serviceable fastener may be used to secure the tubular member to the internally threaded component by inserting one end of the tubular member into the internally threaded component. The torque limiting serviceable fastener is then slid into the internally threaded component so as to initiate engagement of the externally threaded portion of the internally threaded component.

The operator then screws the externally threaded portion of the torque limiting serviceable fastener into the internally threaded component and applies a torque in excess of a predetermined limit sufficient to fracture the shoulder. The installation head portion can then be removed from the tubular member via the removal passage.

An advantage of this tube nut fastener is the ability to control the compressive force applied to the flared end of a tubular member, and visual verification of proper installation of the tube nut.

Other objects, features and advantages of the present invention will become apparent to those skilled in the art from the drawings, detailed description and claims which follow.

DETAILED DESCRIPTION OF THE PREFERRED EMBODIMENT

Figure 2:
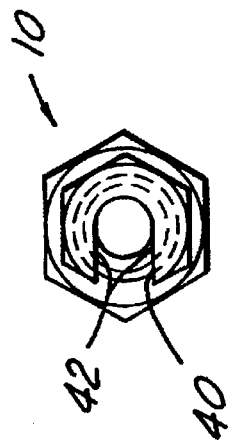
FIG. 2 is an axial view of a torque limiting tube nut according to the present invention.
Figure 1:
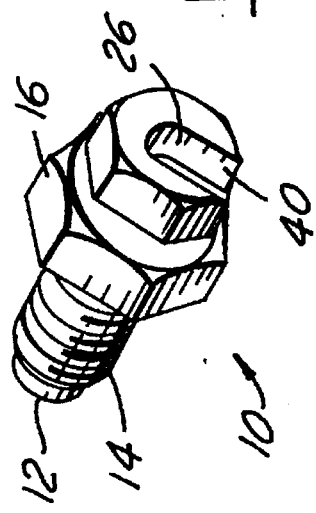
FIG. 1 is a perspective view of a torque limiting tube nut according to the present invention.
Figure 3:
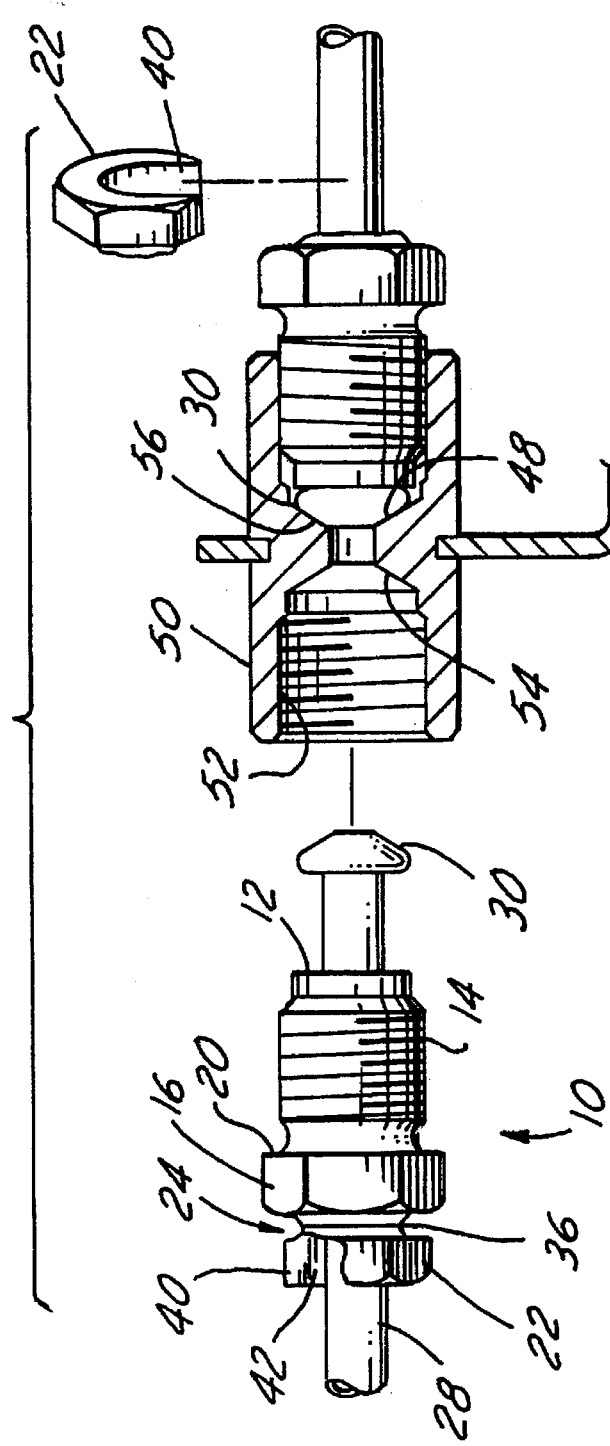
FIG. 3 is a partial sectional view of a torque limiting tube nut according to the present invention.

Referring now to FIGS. 1–3, a torque limiting serviceable fastener 10 having the configuration of the presently preferred embodiment is shown. One end of the fastener 10 includes a compression end 12 disposed adjacent to an externally threaded portion 14 of the fastener 10. The externally threaded portion 14 extends between the compression end 12 and a service head 16. The fastener 10 may include an unthreaded portion 20 between the externally threaded portion 14 and the service head portion 16. An installation head 22 forms an end on a side of the service head portion opposite the externally threaded portion 14. A torque limiting shoulder 24 extends between the installation and service head portions 22, 16. A bore 26 extends axially through each of the portions of the fastener 10 for receiving a tubular member 28 therein. For the purposes of this description, the tubular member described herein will be that of a brake tube. It should be recognized, however, that the present invention would have equivalent functionality and operability when used with any tubular member, such as fuel lines, hydraulic transmission lines and coolant lines.

The compression end 12 is adapted to sealingly engage a flared end 30 of the tubular member 28. The inner periphery of the compression end 12 may be chamfered for improved engagement with the flared end 30. It should be recognized that the compression end 12 would cooperate to permit engagement with SAE, ISO and any other type of flare end 30 commonly known.

The service head portion 16, as shown, has a hexagonal outer periphery to beneficially provide ready interface with common hand tools. It should be noted however, other configurations would provide equivalent operability and functionality.

The installation head portion 22, as shown, has a smaller hexagonal outer periphery than the service head portion 16. Advantageously, since the installation head portion is only used once, it does not require the additional material necessary for strength as required by the service head portion 16. Additionally, greater options regarding exterior shape are available to the designer than simply those that match common hand tools. A custom head may be contemplated to provide optimized powered installation using a powered fastener driver.

The shoulder 24 is located disposed between the installation head portion 22 and the service head portion 16 and consists of a cast or formed-in circumferential groove 36. The shoulder 24 provides a reduced sectional area in the fastener 10 intended to fracture upon being subjected to a predetermined minimum level of torque. In this way, the shoulder 24 prevents the operator from installing the fastener 10 with an excessive amount of compressive force on the flared end 30 of the tubular member 28. It should be recognized that a variety of substitutes for the shoulder 24 are contemplated by the inventors which will provide equivalent operability and functionality. For instance, the shoulder could be cross drilled, intermittently notched, etc. instead of circumferentially grooved.

The installation head portion 22 includes a removal passage 40 extending radially outward from the bore 26. The length of the removal passage 40 is sufficient to allow it to extend entirely through the installation head portion 22. The width of the removal passage 40, between opposed walls 42 is substantially equal to the diameter of the bore 26. The removal passage 40 may also extend axially into the shoulder 24 to facilitate removal to the extent that portions of the shoulder 24 separate with the installation head portion 22. Preferably, the diameter of the bore 26 and the spacing between the opposed walls 42 of the removal passage 40 provides sufficient clearance to permit the fastener 10 and the removal passage 40 to slide and rotate freely on the tubular member 28. The clearance further facilitates the removal of the separated installation head 22 from the tubular member 28, since the installation head portion 22 will slide off of the tubular member 28 along an axis substantially transverse to a longitudinal axis of the tubular member 28, thus allowing gravity to remove the separated installation head portion 22 without further operator intervention.

Use of the fastener 10 may be accomplished by first inserting the flared end 30 of the tubular member 28 into an internally threaded component 50. The internally threaded component 50 may simply consist of a female junction, as shown, or any other internally threaded component, such as a brake caliper, wheel cylinder, proportioning valve, master cylinder, electronically controlled hydraulic actuator, etc.

Next, the torque limiting serviceable fastener 10 is slid up to the internally threaded component 50 so as initiate engagement of the externally threaded portion 14 to an internally threaded portion 52 of the internally threaded component 50. At this point the fastener 10 is ready to be screwed into the internally threaded component 50.

As the fastener 10 is screwed into the internally threaded component 50, the flared end 30 is compressed into a flare receiver 54 to form a fluid sealing interface 56. If too little compression is applied to the flared end 30, the interface 56 may not seal. If too much compression is applied, the flared end 30 may fracture, thereby also causing the interface 56 not to seal. Therefore, there is a predetermined range of fastening torque that will produce a sealed interface.

The installation head portion 22 ensures that the proper compressive force will be applied against the flared end 30 with any torque applying tool. It is sufficient to instruct the operator to simply apply that amount of torque necessary to fracture the installation head portion 22 from the fastener 10. Due to the direct mechanical control inherent in the shoulder 24, sufficient torque is assured by simply applying torque in excess of a predetermined minimum torque sufficient to fracture the shoulder 24. There is no need to prevent or limit the applied torque. This is especially important during assembly in a manufacturing environment, where high torque tools may be desirable for high speed installation. The torque delivered by these tools may be difficult or expensive to control. The present invention eliminates the need for complex and expensive torque controlled tools.

Once the installation head portion 22 has been fractured, the removal passage 40 allows the installation head portion 22 and any part of the shoulder portion 24 to be removed from the tubular member 28. An additional benefit may be obtained by providing a slight interference between the opposite walls 42 with the tubular member 28. This interference will retain the installation head portion 22 until the operator grasps and pulls it to remove it to a recycling bin. Alternatively, the opposite walls 42 may be sized to permit the installation head portion 22 to fall freely away from the tubular member 28 into a recycling bin without further operator intervention.

Finally, in the event the fastener 10 requires service, for instance to remove the internally threaded component 50, an operator can apply a tool to the service head portion 16. The operator can re-install the fastener with a torque indicating wrench to apply the proper re-installation torque.

The foregoing description presents a single embodiment of the present invention. Details of construction have been shown and described for purposes of illustration rather than limitation. Modifications and alterations of the invention will no doubt occur to those skilled in the art that will come within the scope and spirit of the following claims.

We claim:

1. A torque limiting serviceable fastener apparatus for fastening a tubular member to an internally threaded component, said torque limiting serviceable fastener apparatus comprising:

an externally threaded portion;

a service head portion disposed adjacent to said externally threaded portion;

an installation head portion disposed adjacent to said service head portion on a side opposite said externally threaded portion;

a shoulder disposed between said service head portion and said installation head portion, said shoulder being adapted to fracture when subjected to an applied torque exceeding a predetermined torque limit;

a bore extending axially through said threaded portion, said service head portion, said shoulder portion and said installation head portion, said bore having a diameter sufficient to receive the tubular member therethrough; and a removal passage radially disposed in said installation head portion and at least a portion of said shoulder portion, said removal passage being sized sufficiently larger than the tubular member so as to allow separation of said installation head portion from the tubular member upon fracturing said shoulder portion.

2. A torque limiting serviceable fastener apparatus according to claim 1, wherein said shoulder is a circumferential groove.

3. A torque limiting serviceable fastener apparatus according to claim 1, wherein said externally threaded portion includes a compression end disposed opposite from said service head portion, said compression end being adapted to sealingly compress a flared end of the tubular member.

4. A torque limiting serviceable fastener apparatus according to claim 1, wherein said removal passage permits said installation head portion after fracture to be extracted along an axis transverse to a longitudinal axis of said tubular member.

5. A torque limiting serviceable fastener apparatus according to claim 1, wherein said removal passage is sized sufficiently larger than said tubular member to allow gravity to rotate said installation head portion after fracture such that said installation head portion falls off of the tubular member without operator intervention.

6. A torque limiting serviceable fastener apparatus according to claim 1, wherein said installation head portion has a hexagonal outer periphery.

7. A torque limiting serviceable fastener apparatus according to claim 6, wherein said service head portion has a hexagonal outer periphery larger than said installation head.

8. A torque limiting serviceable fastener apparatus for fastening a tubular member to an internally threaded component, said torque limiting serviceable fastener apparatus comprising:

an externally threaded portion having a compression end adapted to sealingly compress a flared end of the tubular member;

a service head portion disposed adjacent to said externally threaded portion;

an installation head portion disposed adjacent to said service head portion on a side opposite said externally threaded portion;

a shoulder disposed between said service head portion and said installation head portion, said shoulder being adapted to fracture when subjected to an applied torque exceeding a predetermined torque limit;

a bore extending axially through said threaded portion, said service head portion, said shoulder portion and said installation head portion, said bore having a diameter sufficient to receive the tubular member therethrough; and a removal passage radially disposed in said installation head portion and at least a portion of said shoulder portion, said removal passage being sized sufficiently larger than the tubular member so as to allow separation of said installation head portion from the tubular member upon fracturing said shoulder portion.

9. A torque limiting serviceable fastener apparatus according to claim 8, wherein said shoulder is a circumferential groove.

10. A torque limiting serviceable fastener apparatus according to claim 8, wherein said externally threaded portion includes a compression end disposed opposite from said service head portion, said compression end being adapted to sealingly compress a flared end of the tubular member.

11. A torque limiting serviceable fastener apparatus according to claim 8, wherein said removal passage permits said installation head portion after fracture to be extracted along an axis transverse to a longitudinal axis of said tubular member.

12. A torque limiting serviceable fastener apparatus according to claim 8, wherein said removal passage is sized sufficiently larger than said tubular member to allow gravity to rotate said installation head portion after fracture such that said installation head portion freely falls off of the tubular member.

13. A torque limiting serviceable fastener apparatus according to claim 8, wherein said installation head portion has a hexagonal outer periphery.

14. A torque limiting serviceable fastener apparatus according to claim 13, wherein said service head portion has a hexagonal outer periphery larger than said installation head.

15. A method for securing a tubular member to an internally threaded component with a torque limiting serviceable fastener, including an externally threaded portion, a service head portion and an installation head portion having a bore passing therein for slidably receiving the tubular member therethrough, comprising the steps of:

inserting one end of said tubular member into an internally threaded component;

sliding said torque limiting serviceable fastener into said internally threaded component so as initiate engagement of the externally threaded portion to said internally threaded component;

screwing said externally threaded portion of said torque limiting serviceable fastener into said internally threaded component;

applying a torque in excess of a predetermined limit sufficient to fracture a shoulder disposed between said installation head portion and said service head portion;

removing said installation head portion from said tubular member via a removal passage disposed in said installation head and at least a portion of shoulder portions of said torque limiting serviceable fastener, said removal passage being sized sufficiently larger than said tubular member to allow said installation head portion to slide off of said tubular member.

16. A method as set forth in claim 15 further comprising the step of servicing said fastener from said service head portion.

* * * * *